United States Patent
Lassota

(10) Patent No.: US 6,741,180 B2
(45) Date of Patent: May 25, 2004

(54) BEVERAGE DISPENSING URN WITH ELECTRONIC DISPLAY

(75) Inventor: Zbigniew G. Lassota, Long Grove, IL (US)

(73) Assignee: Food Equipment Technologies Company, Inc., Lincolnshire, IL (US)

(*) Notice: Subject to any disclaimer, the term of this patent is extended or adjusted under 35 U.S.C. 154(b) by 0 days.

(21) Appl. No.: 09/931,687

(22) Filed: Aug. 16, 2001

(65) Prior Publication Data

US 2002/0145527 A1 Oct. 10, 2002

Related U.S. Application Data

(60) Provisional application No. 60/278,839, filed on Mar. 26, 2001.

(51) Int. Cl.$^7$ .............................................. G08B 21/00
(52) U.S. Cl. ...................... 340/622; 340/623; 340/618; 99/280
(58) Field of Search ............................... 340/622, 623, 340/618; 99/280, 290, 285; 426/231

(56) References Cited

U.S. PATENT DOCUMENTS

| | | | | |
|---|---|---|---|---|
| 4,833,978 A | * | 5/1989 | Martone et al. | 99/280 |
| 4,993,593 A | * | 2/1991 | Fabiano et al. | 222/1 |
| 5,072,660 A | * | 12/1991 | Helbling | 99/280 |
| 5,158,793 A | * | 10/1992 | Helbling | 426/231 |
| 5,183,998 A | * | 2/1993 | Hoffman et al. | 219/492 |
| 5,229,751 A | * | 7/1993 | Chandler et al. | 340/618 |
| 5,285,718 A | * | 2/1994 | Webster et al. | 99/290 |
| 5,309,821 A | * | 5/1994 | Knepler | 99/282 |
| 5,375,508 A | * | 12/1994 | Knepler et al. | 99/280 |
| 5,560,284 A | * | 10/1996 | Weidman et al. | 99/281 |
| 5,671,325 A | * | 9/1997 | Roberson | 392/442 |
| 5,901,634 A | * | 5/1999 | Vancamp et al. | 99/281 |
| 5,956,151 A | * | 9/1999 | Zajac et al. | 356/436 |
| 6,095,031 A | * | 8/2000 | Warne | 99/282 |
| 6,155,158 A | * | 12/2000 | Anson | 99/280 |
| 6,237,811 B1 | * | 5/2001 | Ford | 222/129.1 |
| 6,419,120 B1 | * | 7/2002 | Bertone | 222/129.4 |
| 6,460,735 B1 | * | 10/2002 | Greenwald et al. | 222/146.1 |

* cited by examiner

Primary Examiner—Benjamin C. Lee
Assistant Examiner—Phung Nguyen
(74) Attorney, Agent, or Firm—James W. Potthast; Potthast & Associates

(57) ABSTRACT

A dispensing urn assembly (10, 10') with a hollow body (12) with an interior surface for containing beverage (14) and a manually operable faucet (16) for selectively dispensing beverage (14) from the bottom of hollow body with an electronic status display assembly (50) controlled by a microcomputer (62) in response to a temperature probe (44), a level probe (42) and a timer reset switch (46) to provide graphic displays (64,68, 72), numerical displays (66,70, 74) of the temperature, quantity and time elapsed or remaining since the brewing of the beverage and light indication displays (55,57, 59) when preselected values are ahieved. A an integrated funnel assembly (30') with a down-tube (40) and level probes (174–186) carried by the down-tube (40), electronic module (170) and relatively rigid interconnection (200,174) between provdes a water tight passageway for leads from the probes to the microcomputer (62) contained within the electronic component housing and forms a single subassembly or module that eliminates the need for switches for activation and operation of the display (162) and may be removed for cleaning or repair.

55 Claims, 9 Drawing Sheets

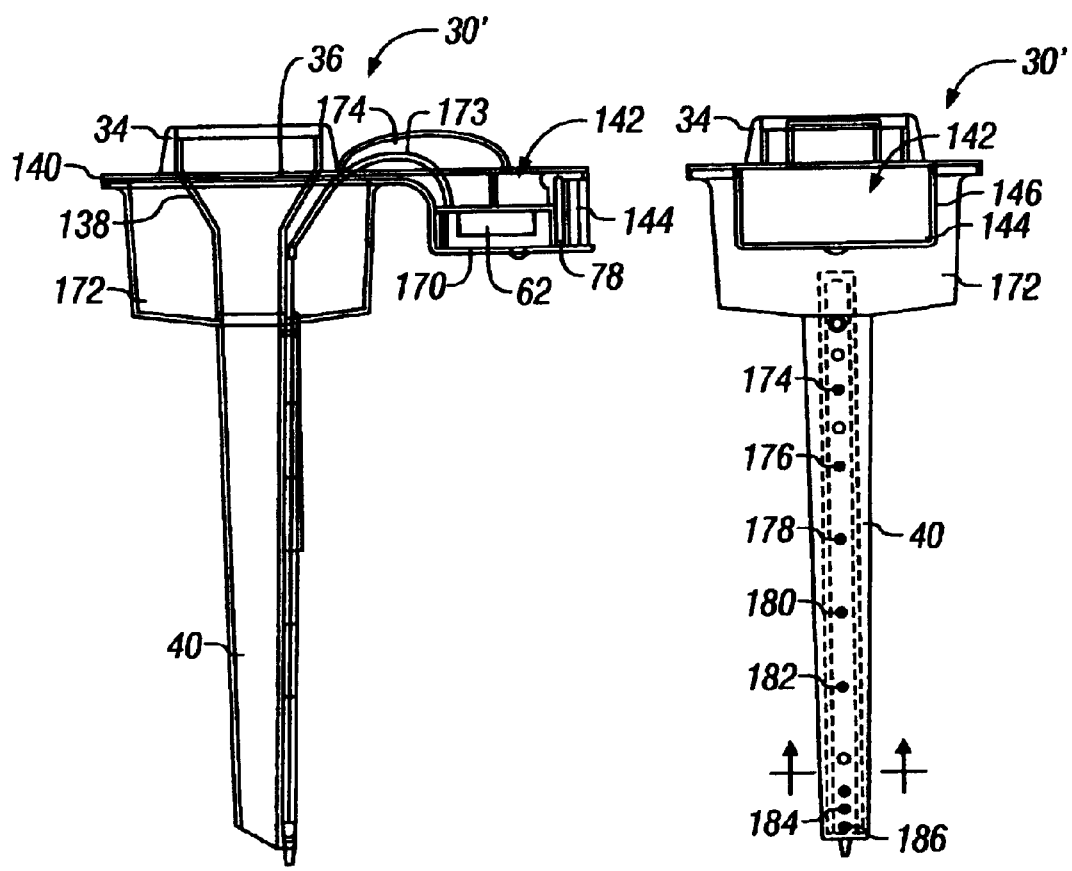
FIG. 11  FIG. 12
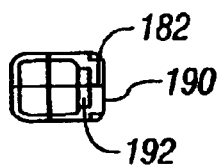
FIG. 13

BEVERAGE DISPENSING URN WITH ELECTRONIC DISPLAY

CROSS-REFERENCE TO RELATED APPLICATION

This application claims, under 35 U.S.C.119 (e), the benefit of U.S. Provisional application No. 60/278,839 filed Mar. 26, 2001 and entitled "Beverage Dispensing Urn with Electronic Display", and assigned to the assignee of the present application.

BACKGROUND OF THE INVENTION

1. Field of the Invention

This invention relates generally to beverage dispensing urns of the type having a faucet for dispensing the beverage from the bottom of the urn and a top with an inlet for direct receipt of freshly brewed beverage from a coffee brewer or the like.

2. Discussion of the Prior Art

Beverage dispensing urns of the type having a top with an inlet for direct receipt of brewed beverage into a hollow, insulated urn body and a manually operable faucet at the bottom for selectively dispensing beverage from the urn into a carafe or serving cups are well known. These dispensing urns generally include a level indicating sight in the form of a glass, plastic or other transparent tube in fluid communication with the beverage in the container such that the level of the beverage within the sight corresponds to the level of the beverage within the hollow body of the urn. The sight and the level of the beverage in the sight is visible from outside of the dispensing urn to enable a user to determine the quantity of beverage contained within the urn without opening the top.

A serious problem with the tubular sights is that after use they become stained or coated with beverage residue. However, even though they must be regularly cleaned for purposes of sanitation and so that the residue does not contaminate and adversely affect the taste and quality of the beverage. Unfortunately, in know urns the small diameters and elongate bodies of the sight tubes renders it very difficult if not impossible to clean the sight tubes and their connections to the urn thoroughly without disassembly.

Consequently, excessive time and labor is spent maintaining the urns in a sanitary condition or they are used in an unclean condition with resultant bad effects on the taste or quality of the beverage. Because of this sanitation problem such urns are not qualified for use with milk products require higher standards of cleanliness than coffee dispensers because of the different nature of the beverages and the different potentials of harm resulting from lack of thorough cleaning. It is believed that there are no beverage dispensers with transparent tubular, level sights, or gauges, approved by the FDA, for use in dispensing milk and other milk products because of the inability to easily clean such level gauges.

In the case of a hot beverage, such as coffee, the temperature decreases over time. In addition, the beverage also deteriorates over time due to contact with the air within the urn from the time it is first brewed directly into the dispensing urn. However, there is there is no way to ascertain the temperature of the beverage in the urn or the quality of the beverage without dispensing a sample for testing or measurement.

SUMMARY OF THE INVENTION

It is therefore an object of the present invention to provide a dispensing urn that overcomes one or more of the foregoing disadvantages of the known dispensing urns noted above.

This objective is achieved in part by providing a dispensing urn assembly having a hollow body with an interior surface for containing beverage and extending between a top with an inlet for receiving beverage and a bottom, and a manually operable faucet attached to an exterior surface of the body adjacent the bottom for selectively dispensing beverage from the hollow body with an electronic status indicator having means attached to the exterior of the dispensing urn to display a condition of the beverage within the hollow body, means for electronically sensing a condition of the beverage within the hollow body, and means for actuating the display means to provide an indication of the beverage condition in response to the electronic condition sensing means. the beverage condition is quantity of beverage contained within the hollow body.

Preferably, the condition sensing means includes means for sensing the temperature of the beverage and the display means includes means to display both temperature and quantity. The temperature display includes at least one of (a) a graphic display, (b) a numerical display or (c) an indicator light.

In addition or by itself, the condition sensing means may include a timer and means for restarting the timer each time beverage is added to the hollow body. In such case, the restarting means includes means for restarting the timer by one of (a) manual actuation of a restart switch or (b) means for automatically restarting the timer in response to the addition of beverage to the hollow body.

The objective of the invention is also obtained in part by providing in association with a dispensing urn assembly having a hollow body with an interior surface for containing beverage and extending between a top with an inlet for receiving beverage and a bottom, and a manually operable faucet attached to an exterior surface of the body adjacent the bottom for selectively dispensing beverage from the hollow body, a method of indicating a condition of the beverage contained within the urn by performing the steps of providing on the exterior of the dispensing urn a display for displaying a condition of the beverage within the hollow body, electronically sensing a condition of the beverage within the hollow body, and actuating the display to provide an indication of the beverage condition in response to the electronic condition sensing means.

Moreover, the objective is acquired by providing a dispensing urn assembly having a hollow body with an interior surface for containing beverage and extending between a top and a bottom, and a manually operable faucet attached to an exterior surface of the body adjacent the bottom for selectively dispensing beverage from the hollow body with an electronic status indicator having means for electronically indicating a condition of the beverage contained within the hollow body, a battery power supply for powering the condition indicating means, and a removable inlet assembly removably mounted to a mounting hole in the top of the dispensing urn body to pass beverage into the hollow body and carrying a power switch actuator for actuating a power switch to selectively connect the battery power supply to the condition indicating means depending upon the relative position of the inlet assembly with respect to the top.

The objective is also obtained partly by providing a dispensing urn assembly having a hollow body with an interior surface for containing beverage and extending between a top and a bottom, and a faucet attached to an exterior surface of the body adjacent the bottom for selectively dispensing beverage from the hollow body, with an electronic status indicator having a funnel assembly with a funnel and a hollow down-tube extending downwardly from the funnel outlet and carrying an electronic beverage sensor, a water tight electronic component housing containing an electronic display and a controller for controlling the display in response to electrical signals from the electronic beverage sensor a relatively rigid, hollow, water tight connection between the funnel assembly and the electronic component housing and carrying electrical leads between the electronic beverage sensor and the controller.

In the preferred embodiment, the electronic beverage sensor is one of a plurality of level sensors. The electronic component housing and the water tight connection are integrally formed together to define a single self contained component of the urn. An elongate watertight channel mounted to and carried along an outer side of the down-tube for carrying the electrical leads provides a watertight passageway to the funnel assembly. The funnel assembly includes a funnel housing providing a watertight enclosure around the funnel and providing a dry passageway between the beverage sensor and the connection to the electronic component module that is attached to the funnel housing. The display includes graphic, incremental display of beverage level and also graphic, incremental displays of elapsed time. A new elapsed time is started when an increase in the level of the beverage is detected. The funnel assembly is supported within an inlet opening in the top of the hollow body and the electronic component housing and display and connection with the funnel assembly are supported by a cover base and held in position by an overlying movably mounted cover closure.

BRIEF DESCRIPTION OF THE DRAWINGS

The foregoing advantageous features will be described in greater detail and other advantageous features will be made apparent form the following detailed description which is given with reference to the several figures of the drawing, in which:

FIG. 11 is a side elevation view of the integrated funnel assembly of FIG. 10;

FIG. 12 is a front elevation view of the integrated funnel assembly of FIGS. 10–11;

FIG. 13 is a sectional view of the end of the down tube taken along the section line of the funnel assembly of FIG. 12.

DETAILED DESCRIPTION

Figure 1:
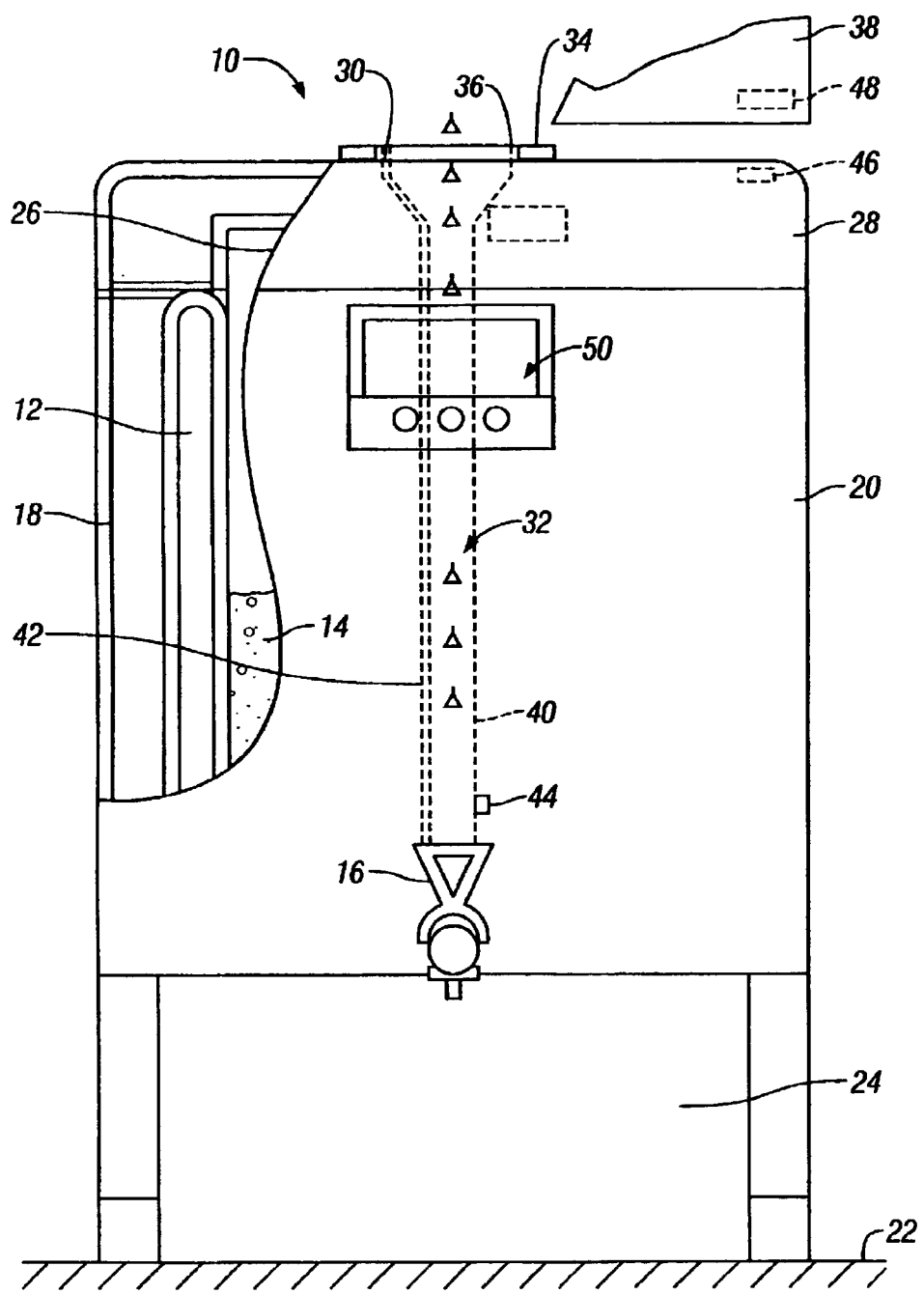
FIG. 1 is a schematic front elevation view of one embodiment of the beverage dispensing urn, or beverage dispenser, of the present invention and also illustrating a portion of a beverage brewer which cooperates with the dispenser to brew the beverage directly into the dispensing urn.

Referring now FIG. 1, a general schematic illustration of one embodiment of the dispensing urn 10 of the present invention is seen to include an insulating, cylindrical, double-walled evacuated liner 12 within which the beverage 14 is received and stored before being dispensed through a faucet 16. The liner 12 is contained within an outer housing 18 having a cylindrical body 20 with a bottom 21 that is supported above a support surface 22 of a serving cart or table or the like by a U-shaped base 24. The liner 12 has an opening 26 at the top of the body 20 substantially closed by a permanently attached, insulating cover 28. The cover 28 has a central inlet opening 30 for mounting receipt of a funnel assembly 32. The funnel assembly 32 includes a collar 34 with a funnel 36 having a funnel-shaped inlet at the top of the funnel 36 for direct receipt of freshly brewed beverage from a coffee maker 38 or the like. The beverage 14 is passed through the funnel-shaped inlet to an upper input end of an elongate fill tube 40 that passes the hot beverage to the bottom of the liner 12.

In keeping with an important aspect of the invention the funnel assembly 32 carries along the length of the feed tube 40 a level-sensing probe 42 and carries at its distal, or free end an electronic temperature probe 44. The top cover 24 also may carry an encased proximity switch 46 actuated by movement away from a magnet 48 carried at the underside of a coffee brewer to start a timer circuit that will be described in detail below, or by any other suitable switch actuator actuated when the dispensing urn is moved away from a brewer after a brew cycle to reset and start a timer for measuring the time since the beverage in the liner 14 was freshly brewed. A display and control panel assembly 50 is mounted to the front of the body 20 to provide an indication of the quantity of beverage in the urn 10 as well as the temperature of the beverage 14 and the time since the beverage 14 was freshly brewed. A controller 52 is mounted in a protective compartment in the top cover 28, as shown in FIG. 3, and controls the display assembly 50 in accordance with inputs from the level sensor 42, the temperature probe 44 and the timer actuation of the timer switch 46.

Figure 2:
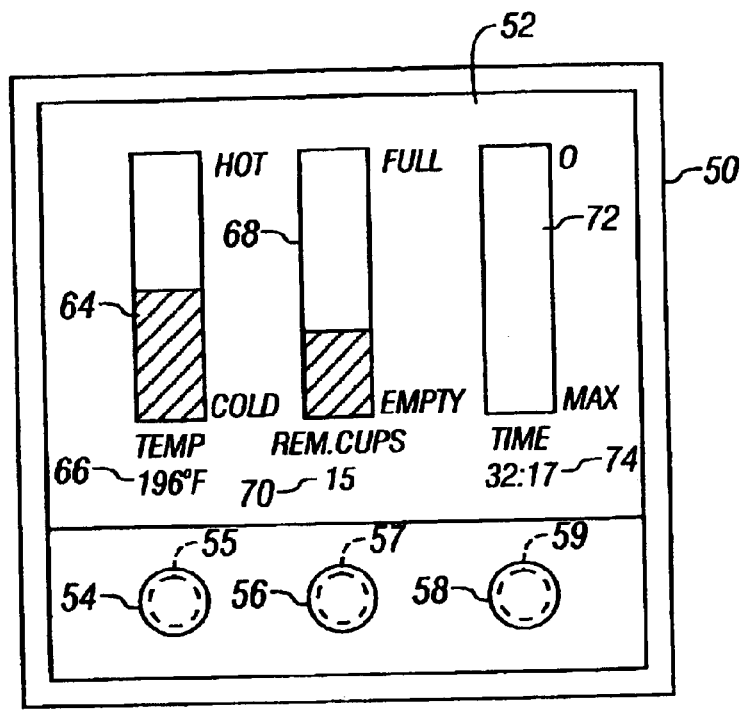
FIG. 2 is an enlarged view of a portion of the dispensing urn of FIG. 1 to better illustrate the display of the embodiment of FIG. 1.

Referring now to FIG. 2, the display and control panel assembly 50 previously shown in the embodiment in FIG. 1, includes a display screen 52, such as a liquid crystal display, that is capable of displaying both alphanumeric as well as graphic representations, and a plurality of back-lighted micro or membrane switches 54, 56 and 58 mounted beneath a closed, flexible switch panel 60. The switches are backlit by back lights 55, 57 and 59. The switches are used to program a computer controller 62, shown in FIG. 3, with the desired parameters or settings relating to quantity, temperature and time. The computer controller 62 preferably provides several indications of the status or condition of the beverage 14.

The temperature is graphically illustrated on a bar graph display 64 which linearly displays the temperature relative to a preselected "hot" temperature parameter and a preselected "cold" temperature parameter that are entered for storage into the computer controller 62 by the operator during a user programming mode. The temperature is also indicated in a numerical display 66, and when the temperature reaches a preselected minimum temperature a light behind the programming switch 54 is actuated to provide a lighted indication that the minimum temperature has been reached. Likewise, the quantity of beverage 14 remaining in the urn 10 is linearly indicated on a bar graph display 68 between a preselected maximum beverage quantity that can be stored by the urn 10 and preselected minimum, such a zero. The quantity of beverage 14 remaining is also indicated numerically at a numerical display 70 such as by the number of cups or servings remaining. When the preselected minimum quantity is reached, then the minimum level indictor light 57 located behind the programming switch 56 is lit to provide a lighted indication of this fact that can be seen from a distance. Likewise, the elapsed time or the time remaining before a preselected maximum time is reached is indicated linearly on a bar graph display 72 between a preselected time limit and zero time. The time is also indicated numerically on a time numerical display 74. When the elapsed time exceeds a preselected maximum time then the indicator light 59 behind the programming switch 58 is lit to provide a lighted indication of the lapse of the maximum time.

Figure 3:
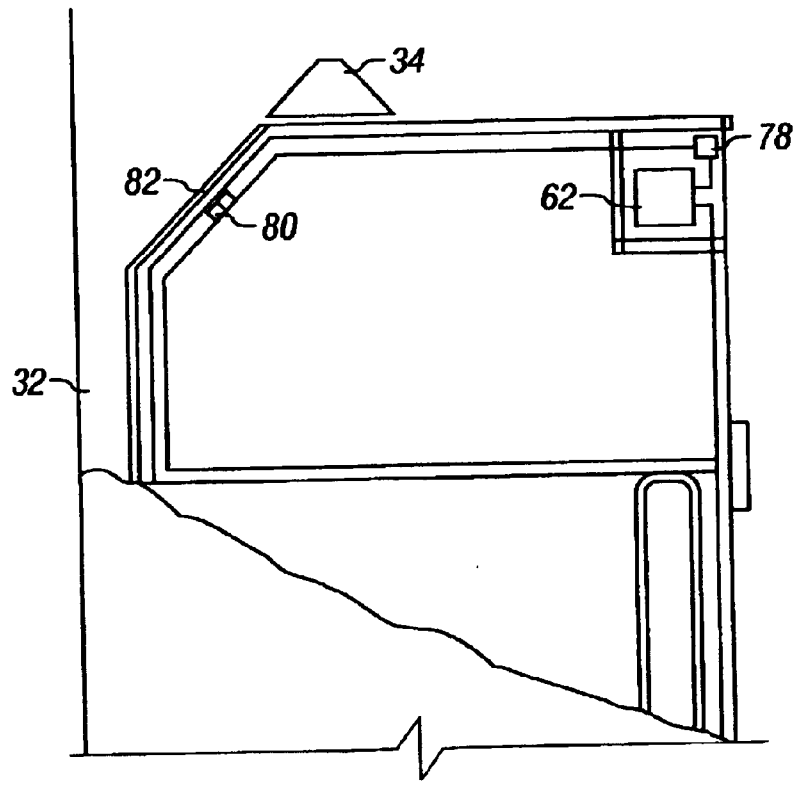
FIG. 3 is a rear view of a portion of the dispensing urn of FIG. 1 to illustrate the location of the battery power supply and microcomputer or other circuit used to interface with the sensors and to control the display.
Figure 4:
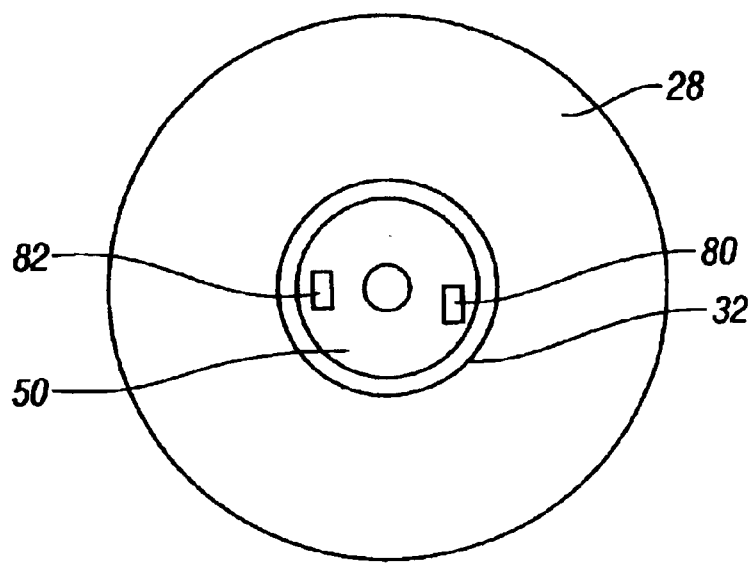
FIG. 4 is a top view of the dispensing urn of FIG. 5.

Referring now to FIG. 3, the computer controller 62 is contained within a protective compartment 76 within the top cover 28 together with a battery power supply, or battery, preferably a long life battery, 78. The battery 78 is connected to the computer controller 62 and the associated display panel 50 and the other associated circuitry through a power switch 80 only when the switch 80 is closed. The power switch 80 is closed to connect the battery 78 to the computer 62 when the funnel assembly 32 is positioned in the inlet opening 30 with an actuator 82 carried by the funnel portion located opposite the power switch 80, as shown in FIG. 3. In accordance with one aspect of the invention, the funnel assembly 50 is put in a different angular position shown in FIG. 4 in which the actuator 82 is spaced from the switch 80 and the switch 80 is not actuated into a power connecting state. In accordance with a method of the invention, the when the dispensing urn 10 is being stored in inventory and during shipping, the funnel assembly 50 is put in the non-actuating position shown in FIG. 4. After the dispenser has arrived on site, then the user is instructed to remount the funnel assembly 32 in the proper actuating position shown in FIG. 3 to connect the battery 78 to the computer controller 62 and the remaining circuitry to thereby enable operation of the display assembly 50. The actuator 82 may be a permanent magnet and the power switch 80 a magnetic reed switch actuated by the presence of the magnet actuator 82. Alternatively, a simple manual actuation switch is used or the user is instructed to install the battery 78 into a battery connection compartment to enable the application of battery power to the computer controller and the other associated circuitry.

Figure 5:
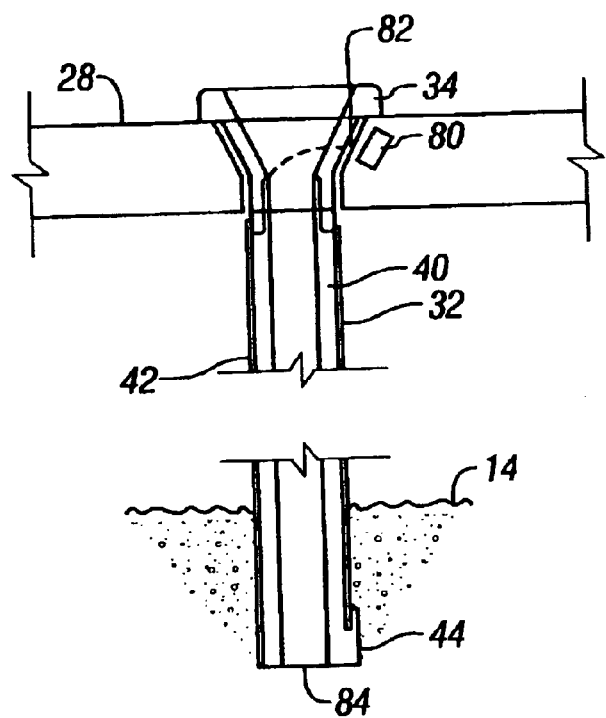
FIG. 5 is an enlarged sectional side view of the funnel inlet assembly shown in broken line in FIG. 1 and shown partly in FIG. 3.

Referring to FIG. 5, the level sensor is preferably an elongate resistive member that is part of a suitable bridge circuit that produces a varying output that varies with the part of the total length of elongate resistive member that is immersed in the liquid beverage 14. This value is then converted to a level that, in turn, in the cylindrical liner 12, is directly and linearly related to quantity. This level indicating signal is converted in the computer controller 62 to a volume quantity, such as the number of cups or servings remaining, for purpose of displaying a numerical quantity, but in the graphic display the level in the display corresponds to the level of the beverage without reference to the actual quantity which may vary with the maximum capacity of the liner 12. In any event, the level is measured electronically and converted to an indication of the level or quantity of beverage remaining or which has been removed.

Similarly, the temperature probe is mounted to or carried by the elongate tube 40 adjacent a bottom end 84 to measure the temperature adjacent the location of the faucet at which the coffee or other hot beverage will be removed. This temperature probe may be a sensor element that has a resistance or other electrical characteristic that varies with the temperature and can thereby be correlated to the temperature.

Figure 6:
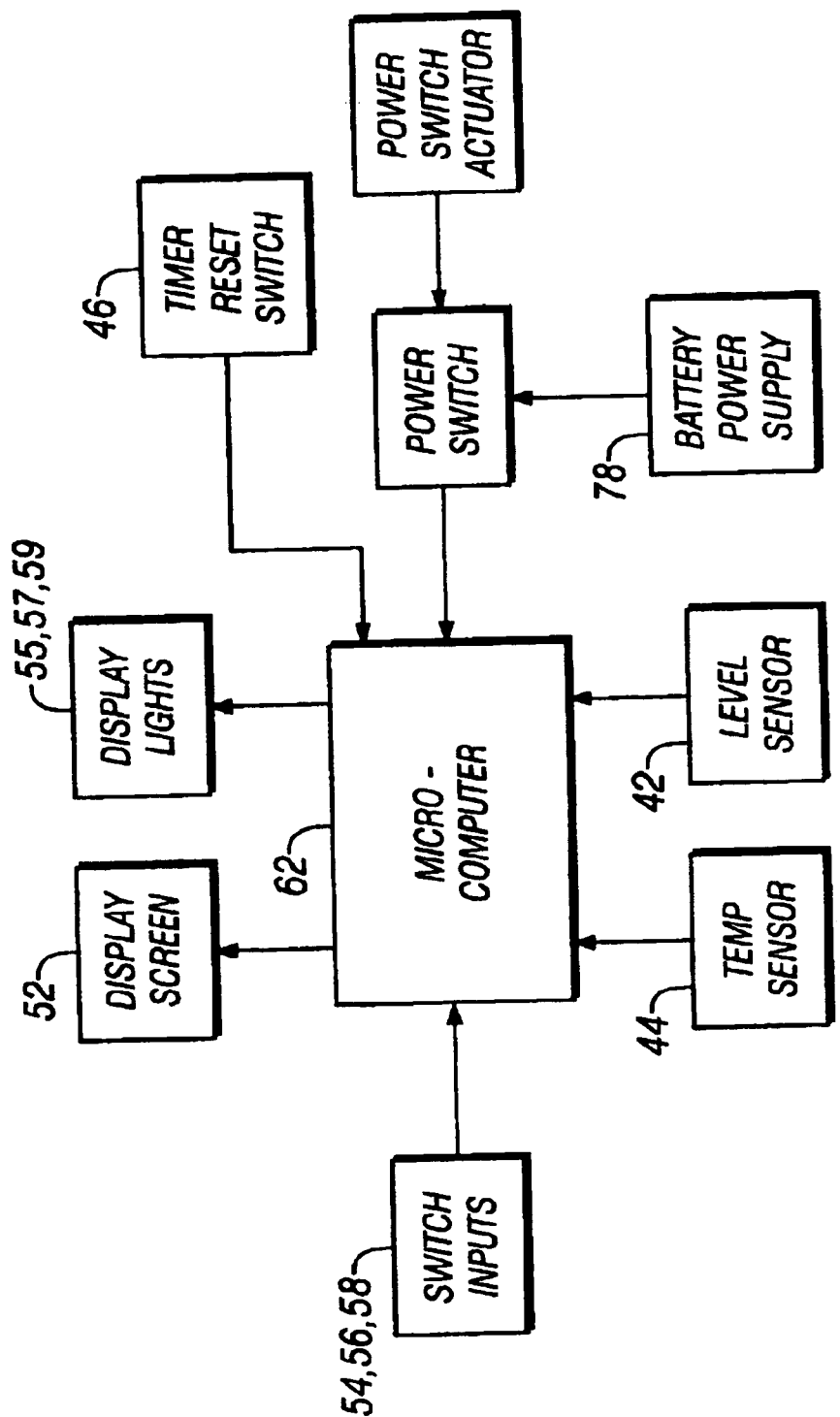
FIG. 6 is a functional block diagram of the display system.

Referring to FIG. 6, the measurement and display system of the present invention is seen to include a microcomputer 90, which receives inputs from the temperature sensor, or probe, 44 and the level sensing probe, or level sensor, 42, the timer reset switch 46 also seen in FIG. 1, and inputs from the switches 54,56 and 58. The input switches are used to enter into and navigate thought the program mode or subroutine in which such parameters as the temperature range and the maximum elapsed time may be entered and stored by the user. The details of how these parameters are entered in the program mode are not inventive and there are many programming techniques available to enable easy entry of this information with three switch inputs used for entry of selections and navigating up and down in the menu choices being offered.

Figure 7:
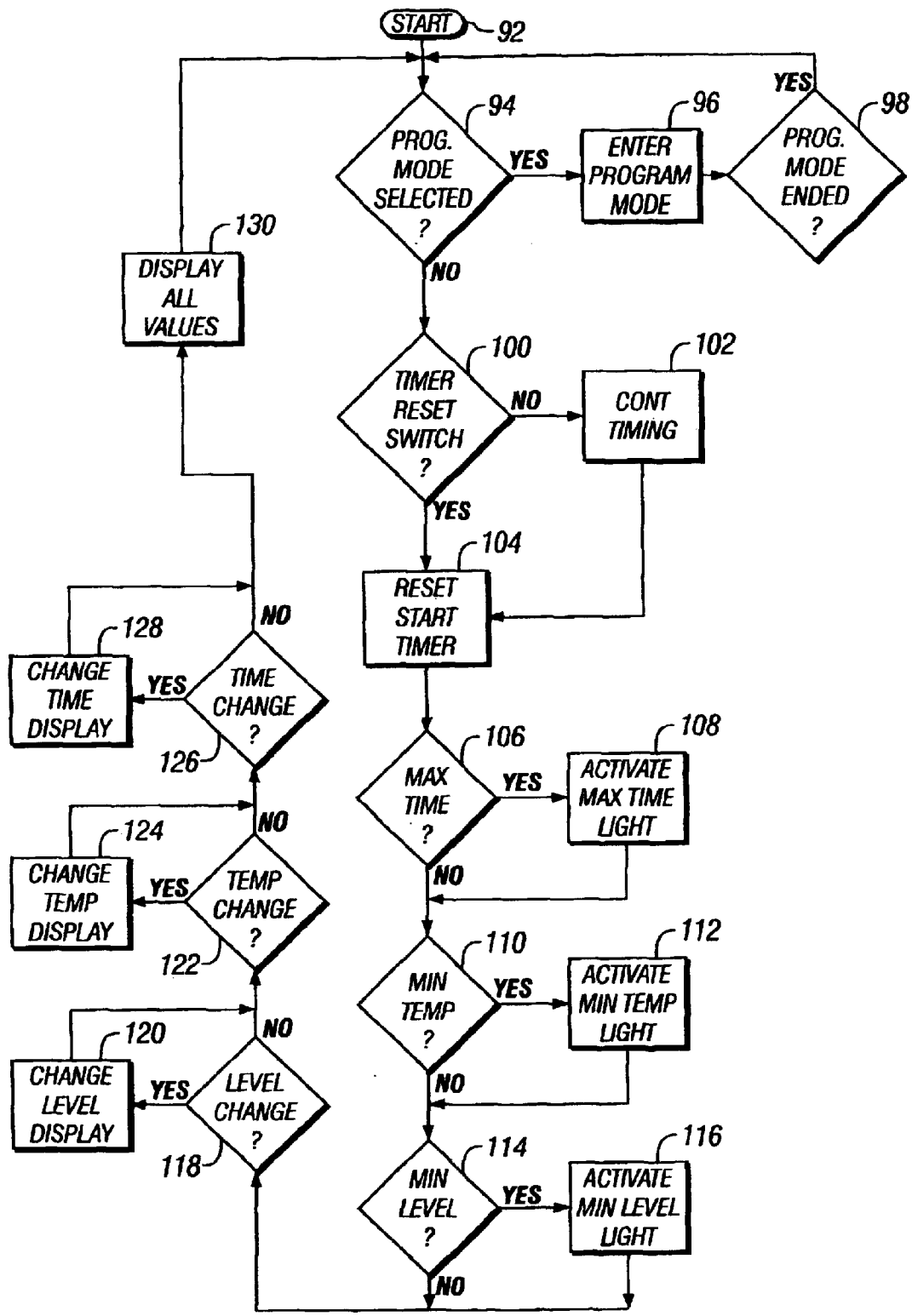
FIG. 7 is a logic flow chart of the software that is used to operate the operation of the display system microcomputer or other circuit for controlling the display in accordance with the senor inputs and manual inputs.

Referring to FIG. 7, after all of the parameters have been entered during programming mode, and the battery 78 is connected with the computer controller 62 the computer controller 62 operates according to this logic flow chart, or algorithm. After start 92, a determination is made in step 94 if the program mode has been selected, such as by sensing that program switch 57 has been kept in an actuated state for more than two seconds, for example. If so, then the program enters the program mode in step 96. In the program mode, a determination of when the program mode is to be exited, either by virtue of an automatic time out if no entries are made or if an exit program option is selected. During the program mode of operation, the display screen is used to prompt the user to make successive selections of various parameters by providing the user with prompts and information needed to navigate through the programming mode and how to make selections. For instance, actuation of the switch 55 may cause the program to digress through the program or menu selection while actuation of the switch may cause the program to progress through the program. After the parameters of maximum and minimum temperatures, the maximum and minimum quantity and the maximum elapsed time have been entered into and stored by the computer controller 62, then in step 98 the user exits the parameters program mode and the program returns to step 94. If no parameter selection is chosen for a preslected time period then the program automatically returns to step 94. If the program mode is not selected, in step 84 the program moves to step 100.

In step 100 a determination is made as to whether the timer-reset switch 46, FIG. 1, has been actuated to start a new elapsed time period when the dispenser is removed from the brewer at the end of the brew cycle. If the timer reset switch has not been actuated, then if the timer has already been started it continues to time in step 102 and the program continues on in the program to step 106 If the dispensing urn is still in contact with the brewer 38 then the timer within the computer controller remains in a reset state awaiting actuation of the timer reset switch 46.

If the timer reset switch 46 is actuated when the dispensing urn 10 is removed from the brewer 38, in step 104 the program resets and restarts the timer and then proceeds to step 106. In step 106, a determination is made as to whether the maximum elapsed time has been reached. If so, then in step 108, the maximum time light, back light 53, is actuated or lit to provide an easily seen indication that the beverage in the dispenser has been stored for the maximum elapsed time, and the program continues to step 110. If the preselected maximum time has not been reached yet, then the program continues to step 110 without first actuating the maximum elapsed time light 59, FIG. 2.

In step 110, a determination is made whether the minimum, preselected temperature has been reached. If the minimum preselected temperature has been reached then in step 112 the minimum temperature back light 55, FIG. 2, is actuated to indicate from a distance that the beverage has dropped below the preselected minimum. The program then continues to step 114. If the minimum temperature has not been reached then the program continue straight to step 114 without actuation of the minimim temperature light.

In step 114, a determination whether the preselected minimum level, or quantity has been reached. If so, then in step 116, the minimum level light is activated to proved a clear indication from a distance. If not, then the program proceeds to step 118 to determine if there has been a change in the level since the last cycle through the program. If so, then in step 120, the graphic and bar graph displays 68 and 70, FIG. 2, are changed accordingly. If not, then the displays remain unchanged and the program proceeds to step 122.

In step 122, it is determined whether the temperature has change sufficiently to change the graphic display 64 and the numerical display 66. If so, then in step 124 the displays are changed to reflect the new temperature that has been sensed by the temperature probe 44. If not, or after the display has been changed, the program proceeds to step 126.

In step 126, a determination is made whether there has been a sufficient change in time to change the graphic time display 72 or the numerical time display 74. If there has been a sufficient time change, such a change of one minute, then in step 128 the time displays are changed accordingly. In step 130, all values of temperature, quantity and time continue to be displayed in step 130 whether there have been changes or not. The program then returns to step 94 and the program loop is repeated.

Figure 8:
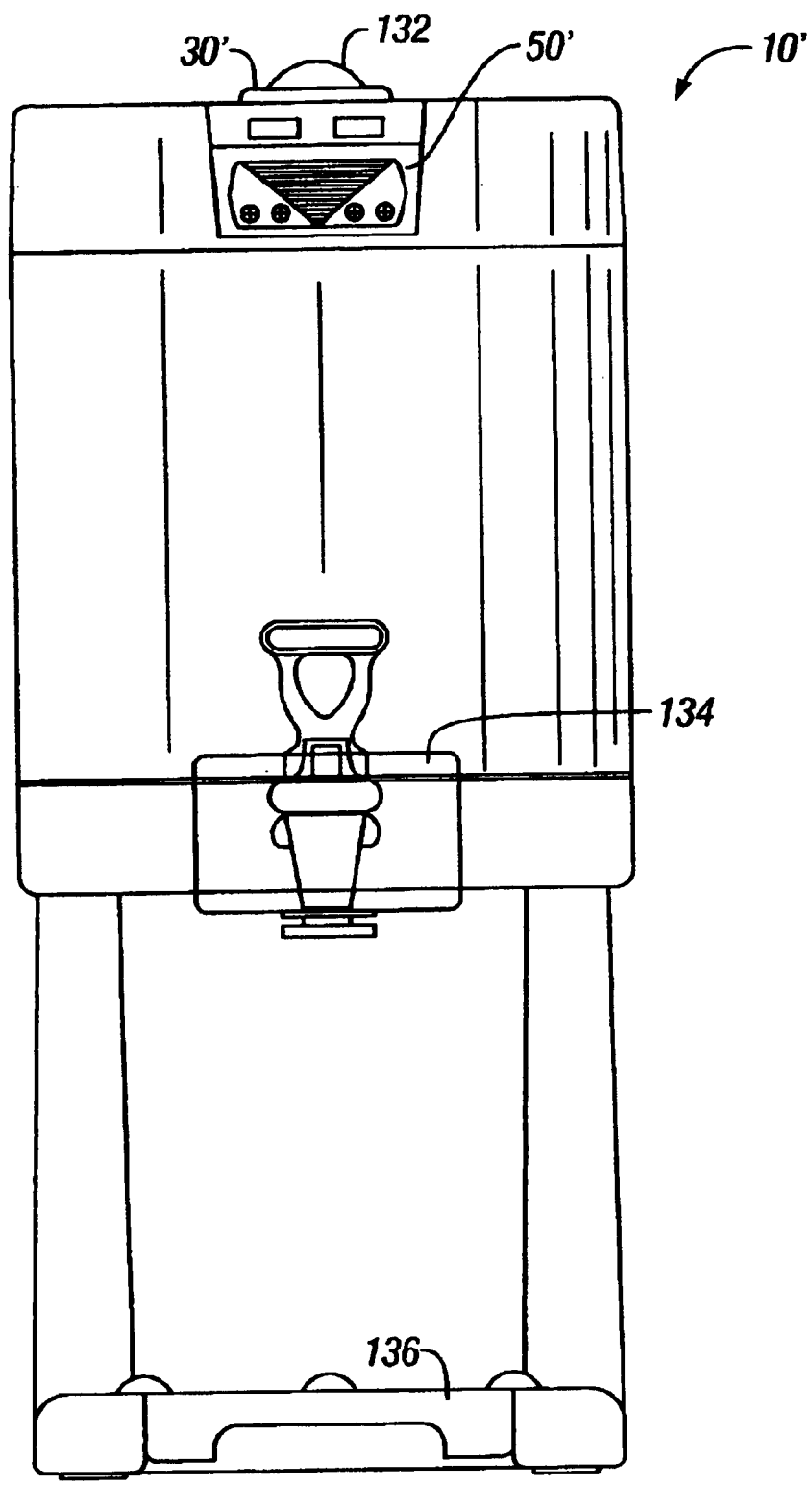
FIG. 8 is a front elevation view of a specific commercial embodiment of the a beverage dispenser incorporating the features of the present invention as generally described above with reference to FIGS. 1–7, but in which the display and all of the electrical components have been integrated into and protectively contained within the removable funnel assembly.

Referring now to FIG. 8, a preferred commercial embodiment 10' of the dispenser of the present invention is shown in which the display 50 has been integrated into the funnel assembly 32 together with the battery power supply 78 and the controller 62 to eliminate the need for interconnecting switches. This combined, or integrated structure also enables sealing all of the electrical elements together within waterproof compartments and to enable removal of the display 50 and electronic elements as a single unit for replacement or repair. The reference numerals used to identify various elements of the beverage dispenser assembly 10 of FIG. 1 are generally used, either with or without a prime, to identify the same or corresponding parts in the commercial dispenser embodiment 10' of FIGS. 8–14 and unless otherwise indicated these parts perform the same function and operate in the same or equivalent ways as described above with reference to FIGS. 1–7. If marked with a prime, the same general function is being performed but there are significant differences relevant to the invention.

Still referring to FIG. 8, the beverage dispenser 10', in addition to the elements already described, has a stopper 132 that is shown in a position closing access to the opening of the funnel to reduce heat loss and to prevent any attempt to refill the beverage dispenser 10' before it has been the use of the beverage dispenser 10'. When the stopper 132 is in the position shown, it blocks sliding movement beneath the brew basket of the coffee maker 38. The beverage dispenser also has a faucet guard 134 and a drip tray 136. These additional parts are of no significance to the present invention except the stopper 132, as will be explained below.

Most importantly, the brewer 10' has a display 50' that is integrated into, and made a part of, the removable funnel assembly 30'. Advantageously, this enables simple manual removal of the display 50' with the funnel assembly 30' for replacement, repair, cleaning and separate shipping in a protective container adapted for protecting the more fragile elements of the beverage dispenser.

Figure 9:
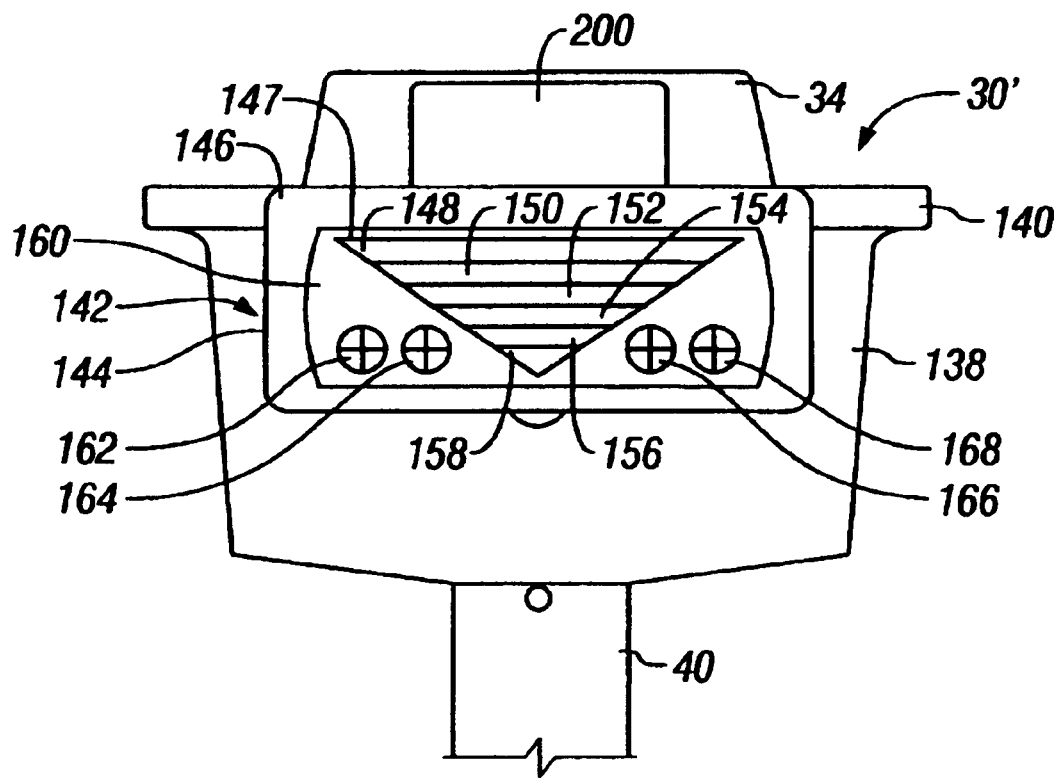
FIG. 9 is an enlarged side elevation view of the integrated funnel assembly of FIG. 8 to more clearly illustrate the display graphics that are used to indicate level and time.
Figure 10:
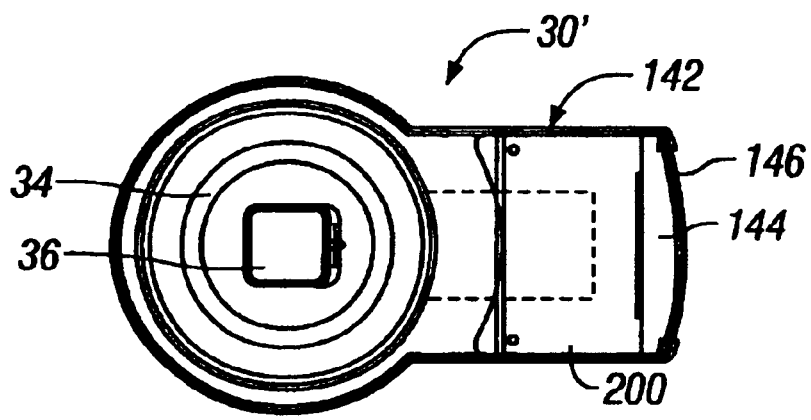
FIG. 10 is a plan view of the integrated funnel assembly of FIGS. 8 and 9.

Referring now to FIG. 9, the integrated funnel assembly 30' is seen to include the collar 34 that extends above the upper surface of the top cover that surrounds the inlet opening 36 to the funnel body 138. The funnel body 138 has a radially extending collar 140 that supports the funnel body 138 within a funnel body receiving opening in the top cover. The bottom of the funnel body drains into the top open end of the feed tube, or down tube, 40 which is an integral part of the integrated funnel assembly 30'. Also, extending from the funnel body 138 is an electronic display module 142 that includes an electronic display screen 144, such as a black and white liquid crystal display or the like, protectively surrounded by a frame 146 that is attached to and comprises an integral part of the display module 140. As seen the display screen 144 preferably displays a triangular graphic display 147 with multiple bars 148, 150, 152, 154, 156 and 158 which are individually representative of successive levels, or quantities of beverage, contained within the body 20 of the dispenser 10'. When all of the bars 148–158 are of a different color than the background 160 of the screen, then a full beverage dispenser is indicated. When none of the bars 148–158 are of contrasting color then an empty beverage dispenser is indicated. For quantities of beverage between empty and full, different numbers of the bars 148–158 are shown in contrasting color, such as black against white. Color displays could of course also be used in which case red and green may be used for instance.

The level of each of the bars may represent a corresponding level of beverage 14 in the liner 12 such that the bars are directly related with each bar representing a different successive level. The difference between adjacent levels is approximately equal except the lowest and second lowest levels. Alternatively, the relative area of the bars 148–158 is representative of a corresponding quantity of beverage such that each successively lower bar represents a lower incremental quantity of beverage contained within the liner 12, regardless of the level, such that the resolution of quantity becomes greater as the quantity of beverage remaining grows less. This alternative can be a user or service programmable parameter.

In addition to the triangular display 147, the display screen also displays a graphic representation of four quartered circles 162, 164, 166 and 168 with each one of the circles circle representing a different one of four successive hours since the beverage dispenser 10' has been filled. Each quarter section of each of the circles represents a quarter of the hour of the circle of which it is a part. If all four circles are shown with a color or shade that contrasts with the background color or shade, then this indicates that it has been four or more hours since the beverage dispenser 10' has been filled. If two entire circles are of contrasting color and two quarters of another one of the circles are of a contrasting color then this indicates that two and one half hours have passed since the beverage dispenser has been filled with freshly brewed coffee or other beverage, etc.

The computer 62 instead of responding to the timer reset switch the is programmed to respond to the level sensors 42, i.e. the level probes 174–184 described below with reference to FIG. 12, below, to reset the timer contained within the computer 62. When the computer receives signal from the level sensor 42 that the level is rising above the uppermost probe 174 after having contacted the next lowest probe 176, indicating that the dispenser has been newly filled, the computer resets the timer to zero and starts the timer. The elapsed time is then displayed as described in response to the elapsed time measured by the timer.

Referring now to FIGS. 10–13, the electronic display module 142 is seen to include an electronics housing 170 that carries the screen 144 and screen frame member 146 at a distal end. Protectively located within the electronics housing 170 is the microcomputer 62, the battery power supply 78, and all interconnections and interfaces with the level sensor 42 and the temperature sensor 44. The funnel body 138 is enclosed by an insulating annular finnel housing 172, and an enclosed passageway 174 extending between the top of the housing 170 and the top of the funnel housing 172 protectively encloses an electrical cable 173 that connects the microcomputer 62 with a plurality of incremental level sensing probes 174, 176, 178, 180, 182 and 184 corresponding to the bar graph display bars 148–158, and a common probe 186, FIG. 9. The lowest probe is the common probe 186 that remains in contact with the beverage even when it is beneath probe 184. A separate wire is used to connect each of the level sensing probes and the common probe 186 with the computer 62.

The computer detects a change of resistance between the common probe 186 and any of the other probes 174–184 when any one of the other probes make or breaks contact with the beverage. When probe 184 is contacted but before probe 182 is contacted, the lowest bar 158 of the display is actuated. When probe 180 is makes contact with the beverage, then bar 156 is also actuated and so on until probe 174 is contacted and the top bar 148 and all the other bars are actuated to indicate the dispenser is full. The top bar 156 remains actuated until the level of the beverage drops beneath the highest probe 174 beverage and the other bars likewise remain actuated until the level drops beneath their associated probe.

As seen in FIG. 13, the probes 174–184 are mounted to an elongate mounting member 182 that extends along the length of the down tube 40 and which provides a channel 192 for wire connections that is isolated from the interior of the down tube and the beverage. The probes are in contact with an outside surface of the mounting member 190 but are sealed to prevent entry of beverage into the channel 192. Thus, it is seen that the integrated funnel assembly 30' with the electronics module and probe carrying down tube all sharing a single housing sealed against water eliminates the need for switches and electrical connectors required when not all the components are part of a single subassembly or module.

Figure 14:
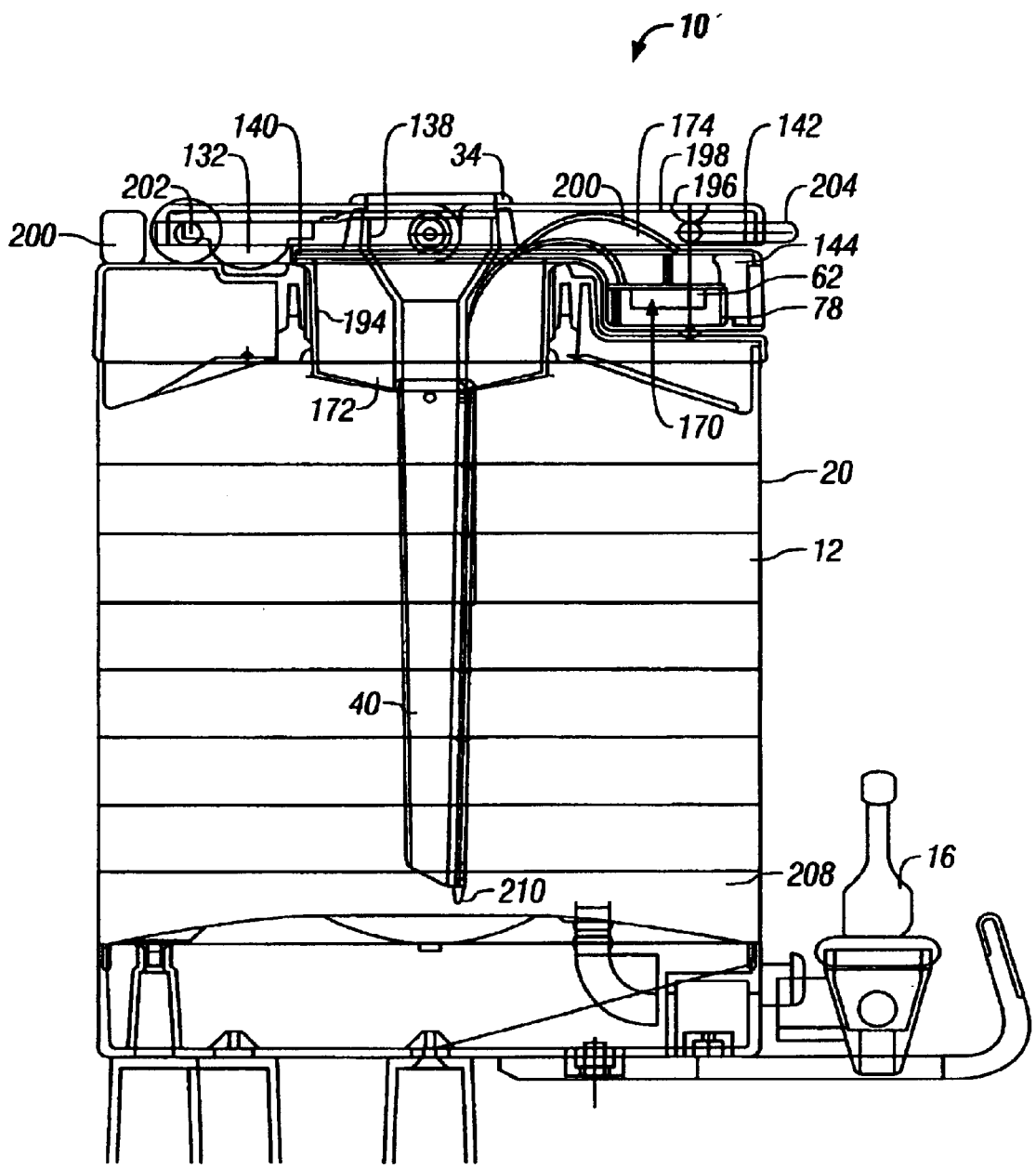
FIG. 14 is a partly sectional side view of the beverage dispenser of FIG. 8 showing the position of the integrated funnel assembly in position within the liner body 12 beneath a pivotally mounted cover with the stopper in position to enable receipt of fresh beverage.

Referring to FIG. 14, the integrated funnel assembly 30' is seen as mounted within the top inlet opening 194 with sealing grommets in sealing engagement with the outside of the funnel housing 172. A closure cover 196 has a center opening with a collar 34 and presses down on the top of the shoulder 194 at the top of the funnel housing 172. A concavity 198 within the cover 196 accommodates receipt of the upwardly extending portion 200 of the integrated funnel assembly 30' that defines the passageway 174 for the cable 173 and presses down on it to also keep it in place when closed. The closure cover 136 is pivotally mounted by means of pivot axes and is latched close by a suitable spring-loaded latch with a pair of pinch members 204 that may be manually squeezed together to release the latch. In order to remove the funnel assembly 30', a handle 206 is lifted above the position shown to enable the cover to pivot, the latch is released, the cover 196 is pivoted upwardly to release the downward hold on the funnel assembly 30' and axle stubs 202 may be slid out of backwardly facing axle slots within which the axle stubs 202 are located. The down tube 40 extends all the way to the bottom 210 of the liner 12 and has a distal end connector 210 received within a mating receptacle within the bottom 210 to secure the distal end of the down tube 40 against lateral movement when fully installed. For further details concerning the closure cover and the other cover components and the seating of the funnel assembly beneath the closure cover 136 reference should be made to United States patent application of the present inventor, Ser. No. 09/930,923 filed contemporaneously with this application and entitled "Beverage Dispenser with Cover Assembly and Method", which is hereby incorporated by reference.

While the details of a particular embodiments have been shown and implementation of the invention has been described above in a particular way, it should be appreciated that many variations may be made without departing from the concepts and scope of the invention as defined in the appended claims. For instance, the quantity can be expressed in units other that cups. The timer can be either an elapsed time or it can be a count-down timer to indicate how much time remains of the preselected time duration. Not all of the displays have to be provided to obtain the benefits derived from use of the other displays. In fact, the embodiment of FIGS. 8–14 has no display for temperature and no means for programming different high/low temperature settings or other parameters, as in the embodiment of FIG. 1, it still displays time and level. Other equivalents and obvious variations will be apparent to persons of ordinary skill in the art.

What is claimed is:

1. In a dispensing urn assembly having a hollow body with an interior surface for containing beverage and extending between a top and a bottom, and a manually operable faucet attached to an exterior surface of the body adjacent the bottom for selectively dispensing beverage from the hollow body, the improvement being an electronic status indicator, comprising:

means for electronically indicating a condition of the beverage contained within the hollow body;

a battery power supply for powering the condition indicating means; and a removable inlet assembly removably mounted to a mounting hole in the top of the dispensing urn body to pass beverage into the hollow body and carrying a power switch actuator for actuating a power switch to selectively connect the battery power supply to the condition indicating means depending upon the relative position of the inlet assembly with respect to the top.

2. The dispensing urn of claim 1 in which the inlet assembly is mounted within the mounting bole and the relative position is a relative rotational position of the inlet assembly within the mounting hole.

3. The dispensing urn of claim 2 in which the inlet assembly carries a movable switch actuator, and the top carries a fixed member actuated by the movable switch actuator when in a preselected position to close a switch and connect the battery power supply to the condition indicating means.

4. The dispensing urn of claim 1 in which the power switch is a magnetic proximity switch having electrical contacts protectively encased within the top and the inlet assembly carries a magnetic actuator member.

5. In a dispensing urn assembly having a hollow body with an interior surface for containing beverage and extending between a top and a bottom, and a faucet attached to an exterior surface of the body adjacent the bottom for selectively dispensing beverage from the hollow body, the improvement being an electronic status indicator, comprising:

a beverage funnel assembly with a funnel body extending between a funnel inlet and a funnel outlet and a hollow down-tube extending downwardly into the hollow body of the dispensing urn assembly from the funnel outlet and carrying an electronic beverage sensor;

a water tight electronic component housing containing an electronic display and a controller for controlling the display in response to electrical signals from the electronic beverage sensor; and a relatively rigid, hollow, water tight connection between the funnel assembly and the electronic component housing and carrying electrical leads between the electronic beverage sensor and the controller.

6. The dispensing urn of claim 5 in which the electronic beverage sensor is one of a plurality of level sensors.

7. The dispensing urn of claim 5 in which the funnel assembly, the electronic component housing and the water tight connection are integrally formed together to define a single self contained component of the urn.

8. The dispensing urn of claim 5 including an elongate watertight channel carried along an outer side of the down-tube for carrying the electrical leads.

9. The dispensing urn of claim 5 in which the funnel assembly includes a funnel housing providing a watertight enclosure around the funnel and providing a dry passageway between the beverage sensor and the connection to the electronic component housing.

10. The dispensing urn of claim 5 in which the display includes graphic, incremental display of beverage level.

11. The dispensing urn of claim 10 in which the display includes display of actual temperature of the beverage contained within the hollow body.

12. The dispensing urn of claim 5 in which the display includes graphic, incremental displays of elapsed time.

13. The dispensing urn of claim 5 in which the funnel assembly is supported within an inlet opening in the top of the hollow body and the electronic component housing and display and connection with the funnel assembly are supported by a cover base and held in position by an overlying movably mounted cover closure.

14. The dispensing urn assembly of claim 5 in which the hollow body is opaque, and including a plurality of level sensors spaced along the down-tube for sensing a plurality of different levels, respectively, and the electronic display displays a plurality of different quantities of beverage in response to the plurality of sensors, respectively.

15. The dispensing urn assembly of claim 5 in which the beverage sensor senses a plurality of different levels of beverage and the electronic display displays a plurality of different quantities in response to the beverage sensor sensing the plurality of different levels, respectively.

16. The dispensing urn assembly of claim 5 in which the hollow body is unheated, the beverage sensor is a temperature sensor for sensing decreasing temperature, and the electronic display is responsive to the temperature sensor for providing a changing indication of temperature as the actual temperature of the beverage within the hollow body decreases.

17. The dispensing urn assembly of claim 5 in which the electronic beverage condition sensor is a temperature sensor, said temperature sensor being mounted adjacent to a distal outlet end of the down-tube that is positioned adjacent the bottom of the hollow body when the beverage funnel assembly is operatively mounted to the hollow body to sense the actual temperature of the beverage within the hollow body.

18. The dispensing urn assembly of claim 17 in which the hollow body is opaque and unheated, and including another electronic beverage sensor for sensing a plurality of different levels of beverage within the hollow body, and means for displaying both a plurality of different quantities of beverage corresponding to the plurality of different levels sensed by the other electronic beverage sensor and for displaying the actual temperature of the beverage.

19. The dispensing urn of claim 18 including an electronic timer for timing the time elapsed since fresh beverage was first added to the hollow body and means for starting the timer, and in which the display means includes means responsive to the timer for displaying the elapsed time.

20. The dispensing urn of claim 5 in which the display includes graphic, incremental display of actual temperature of the beverage contained within the hollow body.

21. The dispensing urn assembly of claim 5 in which the display means displays an indication of the relative levels of a top surface of the beverage within the hollow body in response to the level sensing means between a level associated with the hollow body being filled with beverage and a level associated with the hollow body being nearly empty of beverage.

22. The dispensing urn assembly of claim 5 in which the electronic display displays the level of the beverage by means of at least one of (a) a graphic representation, and (b) a numerical representation.

23. The dispensing urn assembly of claim 5 in which the electronic beverage sensor senses the quantity of beverage contained within the hollow body and in which the electronic display is responsive to beverage sensor to display the quantity of beverage remaining expressed in terms of a number of servings of pre-selected serving size.

24. The dispensing urn assembly of claim 5 in which the electronic beverage sensor includes means for sensing temperature of the beverage that is solely dedicated to providing information needed for display of the actual decreasing temperature of the beverage contained within the unheated, hollow body, and means for sensing different quantities of beverage remaining within the opaque hollow body that is solely dedicated to providing information needed for display of the actual different quantities of beverage contained within the hollow body, and the display means includes means to display both the actual decreasing temperature of the beverage and the actual different quantities of beverage contained within the opaque, unheated hollow body.

25. The dispensing urn of claim 5 in which the beverage temperature display means includes at least one of (a) a graphic display, and (b) a numerical display.

26. The dispensing urn of claim 5 in which the sensing means includes a beverage temperature sensor for sensing the temperature of the beverage relatively adjacent the bottom of the urn body.

27. The dispensing urn of claim 26 in which the display means includes at least one of (a) a graphic display of temperature, (b) a numeric display of temperature, or (c) an indicator light.

28. The dispensing urn of claim 5 in which the condition sensor includes an elapsed time timer carried by the hollow body, and means carried at least in part by the hollow body for restarting the timer each time beverage is added to the hollow body.

29. The dispensing urn assembly of claim 28 in which the display means includes means for displaying the elapsed time of the timer since being reset.

30. In a dispensing urn assembly having a hollow body with an interior surface for containing beverage and extending between a top and a bottom, and a faucet attached to an exterior surface of the body adjacent the bottom for selectively dispensing beverage from the hollow body, the improvement being a method of electronically indicating status, comprising the steps of:

releasably mounting to the top of the hollow body a beverage funnel assembly with a funnel body for passage of fresh beverage between a funnel inlet and a funnel outlet, and a hollow down-tube extending downwardly into the hollow body of the dispensing urn assembly from the funnel outlet;

carrying into the hollow body with the down-tube an electronic beverage condition sensor mounted to the down-tube when the beverage funnel assembly is releasably attached to the top of the hollow body;

passing fresh beverage through the funnel assembly and the down-tube into the hollow body;

sensing with the electronic beverage condition sensor an actual condition of the beverage contained within the hollow body;

protecting a display controller within a water tight component housing of the funnel assembly;

passing electrical signals through an electrical lead extending from the electronic beverage condition sensor to the controller via a relatively rigid, hollow, water tight passageway extending along the down-tube and through the funnel body between the sensor and the electronic component housing; and controlling a display mounted to the funnel assembly of the funnel assembly with a controller contained within the water tight electronic component housing of the funnel assembly in response to electrical signals from the electronic beverage sensor to display the actual beverage condition.

31. The method of claim 30 including the steps of sensing a plurality of different levels of a top surface of the beverage within the hollow body, and displaying on the display a plurality of different quantities associated with the plurality of different levels in response to the level sensor.

32. The method of claim 30 in which the funnel assembly, the electronic component housing and the water tight connection are integrally formed together to define a single self-contained component of the urn.

33. The method of claim 30 in which the electrical signals are passed on a lead extending along an elongate watertight channel carried along an outer side of the down-tube.

34. The method of claim 30 in which the funnel assembly includes a funnel housing providing a watertight enclosure around the funnel and providing a dry passageway between the beverage sensor and the connection to the electronic component housing.

35. The method of claim 30 in which the step of displaying includes displaying a graphic display of beverage quantity.

36. The method of claim 30 in which the step of displaying includes displaying graphic displays of elapsed time.

37. The method of claim 30 including the steps of supporting the funnel assembly within an inlet opening in the top of the hollow body; and in which supporting the electronic component housing and display and connection with the funnel assembly with a cover base, and holding the funnel assembly in position by an overlying movably mounted cover closure.

38. The method of claim 30 in which the hollow body is opaque and the step of sensing the beverage condition includes the step of sensing a plurality of different levels with a plurality of level sensors.

39. The method of claim 30 in which the funnel assembly, the electronic component housing and the water tight connection are integrally formed together to define a single self-contained component of the urn.

40. The method of claim 30 in which the steps of passing includes the step of passing signals along a lead contained within an elongate watertight channel mounted along an outer side of the down-tube for carrying the electrical leads.

41. The method of claim 30 in which the funnel assembly includes a funnel housing providing a watertight enclosure around the funnel and providing a dry passageway between the beverage sensor and the connection to the electronic component housing.

42. The dispensing urn of claim 30 in which the display includes graphic, incremental display of beverage level.

43. The method of claim 30 in which the step of displaying includes the step of displaying elapsed time since the hollow body was filled with beverage.

44. The method of claim 30 in which the funnel assembly is supported within an inlet opening in the top of the hollow body and the electronic component housing and display and connection with the funnel assembly are supported by a cover base and held in position by an overlying movably mounted cover closure.

45. The method of claim 30 including the steps of reducing the loss of heat of the beverage within the hollow body solely by means of passive means requiring no source of A.C. power, sensing with beverage beverage condition sensor the actual temperature of the beverage within the hollow body, and displaying on the electronic display in response to the beverage condition sensor a changing indication of temperature as the actual temperature of the beverage within the hollow body decreases over time.

46. The method of claim 30 in which the electronic beverage condition sensor is a temperature sensor, and including the step carrying the temperature sensor adjacent a distal outlet end of the down-tube to sense the actual temperature of the beverage within the hollow body adjacent the bottom of the hollow body when the beverage funnel assembly is operatively mounted to the hollow body to sense the actual temperature of the beverage within the hollow body.

47. The method of claim 30 in which
the hollow body is opaque and unheated, and including the steps of
sensing a plurality of different levels of beverage within the hollow body with another electronic beverage sensor, and
displaying both a plurality of different quantities of beverage corresponding to the plurality of different levels sensed by the other electronic beverage sensor and for displaying the actual temperature of the beverage.

48. The method of claim 30 including
timing the time elapsed since fresh beverage was added to the hollow body with a electronic timer carried by the funnel assembly,
automatically starting the timer in response to the addition of beverage to the hollow body, and
displaying an indication of elapsed time in response to the electronic timer.

49. The method of claim 30 in which
the hollow body is insulated and unheated, and the step of displaying includes
displaying an indication of the actual temperature of the beverage contained within the hollow body.

50. The method of claim 30 in which the step of displaying includes graphically, displaying incremental changes of actual temperature of the beverage contained within the hollow body.

51. The method of claim 30 in which the display means displays an indication of the relative levels of a top surface of the beverage within the hollow body in response to the level sensing means between a level associated with the hollow body being filled with beverage and a level associated with the hollow body being nearly empty of beverage.

52. The method of claim 30 in which the electronic display displays the level of the beverage by means of at least one of (a) a graphic representation, and (b) a numerical representation.

53. The method of claim 30 in which the electronic beverage sensor senses the quantity of beverage contained within the hollow body and in which the step of displaying includes displaying the quantity of beverage remaining expressed in terms of a number of servings of pre-selected serving size.

54. The dispensing urn assembly of claim 30 in which
the electronic beverage sensor includes
means for sensing temperature of the beverage that is solely dedicated to providing information needed for display of the actual decreasing temperature of the beverage contained within the unheated, hollow body, and
means for sensing different quantities of beverage remaining within the opaque hollow body that is solely dedicated to providing information needed for display of the actual different quantities of beverage contained within the hollow body, and
the display means includes means to display both the actual decreasing temperature of the beverage and the actual different quantities of beverage contained within the opaque, unheated hollow body.

55. The method of claim 30 in which the beverage condition sensor includes
an elapsed-time timer carried by the hollow body, and including the step of
restarting the timer each time beverage is added to the hollow body by means carried at least in part by the hollow body.

* * * * *